United States Patent [19]

Haag

[11] Patent Number: 4,760,381
[45] Date of Patent: Jul. 26, 1988

[54] INTRUDER-DETECTION SYSTEM FOR ROOM SECURITY

[75] Inventor: Guenter Haag, Stuttgart, Fed. Rep. of Germany

[73] Assignee: Telenot Electronic GmbH, Aalen-Hammerstadt, Fed. Rep. of Germany

[21] Appl. No.: 810,749

[22] Filed: Dec. 19, 1985

[30] Foreign Application Priority Data

Dec. 22, 1984 [DE] Fed. Rep. of Germany ....... 3447131

[51] Int. Cl.$^4$ .............................................. G08B 13/18
[52] U.S. Cl. .................................... 340/556; 250/221; 340/552
[58] Field of Search ............... 340/541, 550, 552, 555, 340/556, 565, 567, 600; 250/341, 349, 221

[56] References Cited

U.S. PATENT DOCUMENTS

| | | | |
|---|---|---|---|
| 2,198,725 | 12/1937 | Smith | 340/567 |
| 3,444,544 | 5/1969 | Pearson et al. | 340/555 |
| 3,858,043 | 12/1974 | Sick et al. | 340/555 |
| 3,958,118 | 5/1976 | Schwarz | 340/567 |
| 4,479,053 | 10/1984 | Johnston | 340/555 |
| 4,656,462 | 4/1987 | Araki et al. | 340/556 |

Primary Examiner—Joseph A. Orsino
Assistant Examiner—Brian R. Tumm
Attorney, Agent, or Firm—Hopgood, Calimafde, Kalil, Blaustein & Judlowe

[57] ABSTRACT

In this system for the securing of rooms, one or more transmitting elements emit suitably modulated light pulses into given regions or sectors which are produced by specially shaped optical components and/or by a special alignment of the transmitting elements and/or by the application of absorbent layers to an infrared filter which is located in front of the transmitting elements and receiving elements. One or more receiving elements receive the incident radiation. Changes in the radiation field with respect to intensity and/or speed of change of the intensity and/or phase are processed in subsequent evaluation logic circuitry. The room security system can also be combined into a larger unit with common evaluation logic.

14 Claims, 5 Drawing Sheets

INTRUDER-DETECTION SYSTEM FOR ROOM SECURITY

BACKGROUND OF THE INVENTION

The present invention relates to a room-security system wherein one or more transmitting elements and one or more receiving elements are relied upon for detection of intruder presence or motion within the security area.

Known room-security systems are based on different physical techniques and principles. Thus, it is known from West German Pat. No. 2,653,111 to detect the presence of an object, for example, an unauthorized person or a burglar, within a secured space or area by the infrared radiation (body radiation) coming from said object; such detection utilizes suitable detectors and reflector surfaces which reflect, onto a common radiation receiver, radiation impinging from different separate receiving areas.

This method has the advantage of a very low average current consumption; however, systems utilizing this method are disadvantageous in that they are characterized by a relatively poor security factor and by too-frequent false alarms which, in principle, cannot be eliminated, even by the use of plural reflector surfaces which focus the radiation impinging from different separate receiving areas onto a common radiation receiver. These disadvantages result from the involved basic physical principle and from the nature of electromagnetic radiation within the region between 10 and 30 $\mu$m.

Furthermore, from West German Pat. No. 3,032,510 a room-security system is known which employs a source of light as an energy radiator, and an optoelectronic receiver as the energy receiver; the said source of light radiates ultraviolet light, and energy impinging on the receiver is varied by persons or objects entering into or moving within the space to be secured and monitored. This system is provided with an evaluation circuit and is characterized by the fact that the light source diffusely distributes UV radiation within the room and that the optoelectronic receiver is shielded from the source of light; the UV radiation is radiated with pulse modulation, and an electronic receiving device receives the modulated UV radiation and, recognizing danger (or a disturbance in operation) from a disturbance of the pulse code, forwards a signal to give off the alarm.

This security method, however, has the disadvantage, in addition to the health-impairing effects of UV radiation, that it results in unavoidable, relatively high current consumption. Since the source of light distributes UV radiation diffusely in the room, a person who approaches the secured region from the outside produces a continuous change in the signal at the receiver. The reliable detection of an alarm condition, as well as the differentiation between alarm and disturbance, is therefore not realizable with sufficient reliability, so that completely reliable use of this room-protection system is not assured, and false alarms are again too frequent.

Other intruder-detection methods are based on ultrasonics and utilize the Doppler effect. The Doppler signal which is formed is, however, dependent on the relative speed of the entering person relative to the surrounding air and the nature of air circulation in the room; and the range of speeds can change greatly as a function of limiting conditions, such as temperature and the condition of the windows and doors, whether closed or open. For these and other reasons, these Doppler systems are extremely susceptible to failure.

BRIEF STATEMENT OF THE INVENTION

The object of the present invention is to eliminate the aforementioned disadvantages and at the same time to assure the advantage of an extremely low consumption of current in a room-security system, wherein susceptibility to false alarms is considerably reduced and wherein, in particular, a greater security factor is available than in use of existing passive systems.

This object is achieved by a system which provides one or more transmitting elements that transmit suitably modulated or coded light into given spaced directionally localized regions or sectors which extend over the room area of protection. These "illuminated" regions or sectors are produced by specially shaped optical components such as, for instance, lenses, and/or by the use of one or more spherical or aspherical reflectors and/or by a special alignment of the transmitting elements with suitable selection of the radiation characteristic of the transmitting elements and/or by the additional application of absorbent layers to an infrared filter which is positioned in front of the transmitting and receiving elements or by the use of a special perforated or slitted mask; between the said "illuminated" regions or sectors there are zones which are not illuminated directly by the radiation emitted by the transmitting elements. In the event of intrusion into the protected room, the "illuminated" regions or sectors provide a source of light scattering which is characterized by the modulation or coding, and one or more receiving elements selectively respond to incident scattered radiation and to changes of scattered radiation produced within the room. The received radiation and/or radiation change is evaluated with respect to intensity and/or rate of change of intensity and/or phase, using evaluation-logic circuitry, and an alarm is given off, in particular, when certain threshold values are reached.

Suitable transmitting elements include infrared light-emitting diodes, Gatlets-IRED's, such as manufactured, for example, by the TRW Company of 1207 Tappan Cude, Carrollton. These diodes are characterized by excellent quantum yield and long life. Various optical techniques can be used to assure that only given regions or sectors are illuminated by the transmitting elements. Reflectors constructed of individual segments are conceivable, the specific shape of a segment being in each case decisive for the spatial configuration or a given illuminated region or sector. The optimal shape of the individual segments is determined as a function of the desired (structure of the) regional division of the room which is to be protected, namely, (a) into regions or sectors which are illuminated by the transmitting elements and (b) into non-illuminated zones. In many cases of use, simple geometric surfaces such as cylindrical surfaces, flat mirrors or surfaces of ellipsoids of revolution satisfy the requirement. A further possibility for the shaping of the regions or sectors to be illuminated is provided by the application of infrared-absorbing layers on suitably developed reflectors.

It is also possible to use transmitting elements which have a suitable radiation characteristic, such as, for instance, the largest possible angle of radiation in the one plane and the smallest possible angle of radiation in the plane perpendicular thereto. By additionally applying layers which absorb infrared radiation to the infrared filter present in front of the transmitting and receiving elements, the geometrical shape of said regions or sectors can be determined even more precisely.

If electromagnetic radiation of a wavelength of 800 nm to 1 μm is used, then diffraction effects can, for present purposes, be completely neglected; this is in contrast to systems which rely on body radiation, at wavelengths greater than 10 μm. Use of the 800 nm to 1 μm range also makes it possible to use simple optical lens systems as structure-forming elements for the individual regions or sectors.

An infrared filter provides assurance that daylight or even direct sunlight cannot interfere with the operation of the receivers, and that the room security system is also not visible from the outside.

For infrared alarms based on body radiation (passive infrared), radiation from the sun in particular is a possible source of disturbance. Sun radiation can be of such intensity in the range between 5 and 30 μm that a false alarm can even be produced by a reflecting surface.

This problem is avoided by the present invention in the manner that light pulses having a given carrier frequency or coding are emitted by one or more transmitting elements, and only changes in signals which possess the corresponding carrier frequency or code are further evaluated in evaluation logic which processes outputs of the receiving elements. In this way, the most important source of false alarms of the prior (passive infrared) room-security systems is eliminated.

In order to prevent a false alarm being given by insects present in the path of the beam, the invention utilizes at least two transmitting elements and receiving elements. One possibility of evaluation utilizes transmitting elements emitting light pulses in alternating succession, with similarly modulated light in each alternation, and that the receiving elements are associated, also in alternation, with given transmitting elements. In this case, it is also conceivable and possible to connect the receiving elements alternately to a common evaluation channel by the use of analog switches and to compare the corresponding signals with one another and/or with predetermined threshold values, using existing electronic methods of signal processing. In this way, the expense for electronic circuitry is considerably reduced. To avoid false alarms, the logic circuitry requires that impermissible changes in level must occur at both receiving elements. Of course, it is also conceivable and possible to provide more than two transmitting and receiving elements and to control them in groups, or else individually.

To keep current consumption as low as possible, it is advisable that the pulse duration of the light pulses be selected substantially shorter than the repetition time of the light pulses. Furthermore, the period of oscillation of the modulation should be small as compared with the pulse duration of the light pulses in order to obtain a favorable signal/noise ratio.

Another possible way of eliminating local sources of disturbance is, for instance, to provide at least two transmitting elements and two receiving elements and for the transmitting elements to emit light pulses with a different modulation of light from each transmitting element; in this event, each of the receiving elements is caused to respond uniquely to the modulation of one to the exclusion of the other of the transmitting elements; at the same time, it is possible for the outputs of at least two receiving elements to be evaluated simultaneously in evaluation-logic circuitry, in order for an alarm to be given.

Of course, it is also conceivable and possible to interchange the transmitting elements and receiving elements, i.e , to reverse the ray path. The conclusions resulting from this can easily be derived physically and will therefore not be discussed in detail.

In the present specification, reference is constantly made of light. The expression "light" is to be understood in this connection as a generic concept for electromagnetic radiation: in other words, electromagnetic radiation of any wavelength which is adapted to the specific problem can be used for the presently described room-security system, and of course for the indicated 800 nm to 1 μm range, the radiation is not visible.

BRIEF DESCRIPTION OF THE DRAWINGS

The operation and construction of several room-security embodiments of the invention will be described in detail with reference to the accompanying drawings, in which.

DETAILED DESCRIPTION

Figure 1:
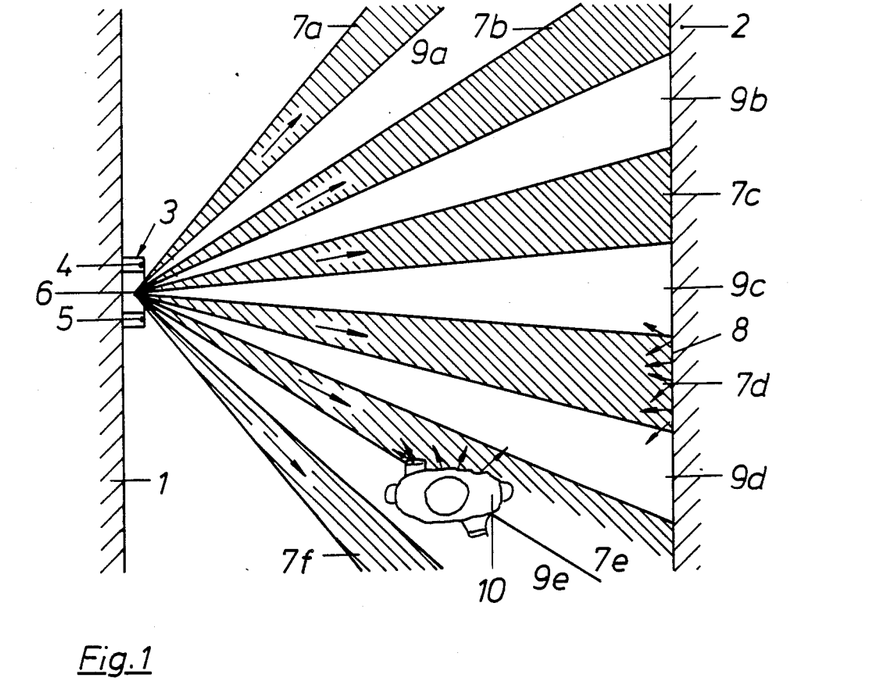
FIG. 1 is a basic plan-view diagram, to illustrate overall operation of a system of the invention.

FIG. 1 serves for basic illustration of the manner of operation of a room-security system 3 of the invention. The system 3 comprises spaced receiving elements 4, 5 and one-or-more transmitting elements 6, and the system 3 is mounted to a wall 1. The transmitting elements 6 radiate, for example, suitably modulated light pulses into angularly spaced regions or sectors 7a to 7f. Between these actively illuminated regions or sectors, there are zones 9a to 9e which are not directly illuminated by radiation emitted by the transmitting elements 6. If the light pulses now impinge upon objects present in the room or on the surrounding walls 2, there is partial absorption of the radiation, as well as greater or lesser diffuse scattering 8. This scattered light is received by the receiving elements 4, 5 and evaluated in subsequent evaluation logic circuitry.

In this connection, the evaluation considers only those parts of the electromagnetic radiation field whose variation agrees with the modulation or coding of the emitted light pulses. If an unauthorized person now enters from the outside and into the monitored space, and if such person moves through the illuminated regions or sectors 7a to 7f, then the presence of the person's body is the occasion for a change in the diffuse scattering of the emitted light pulses, as perceived at the receiving elements 4, 5. The change in the electromagnetic radiation field which is thus present at the receiving elements 4, 5 is evaluated with regard to intensity, rate of change of the intensity and/or phase in the evaluation logic circuitry. When certain threshold values are reached, an alarm is given off.

Figure 2:
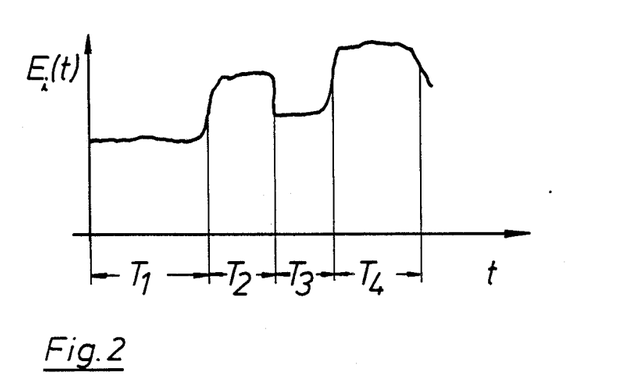
FIG. 2 is a graph of the possible time-variation of the signal output of a receiving element in the system of FIG. 1.

FIG. 2 shows, by way of example, one possible variation of the received radiation field $E_r(t)$ with time. As indicated, the division of the room into illuminated regions or sectors 7a to 7f, with interposed unilluminated zones 9a to 9e, has the advantage that an unauthorized person upon moving through the room rapidly produces changes in signals at the receiving elements 4, 5. During the time $T_1$, no change in the radiation field is noted in the region of the room covered by the receiving elements. It is assumed here that, within the time interval $T_2$, an unauthorized person enters into an illuminated region or sector and thus causes a change in the radiation field; that, during the time interval $T_3$, the unauthorized person moves through an adjacent zone which is not directly illuminated; and that during the time $T_4$, he has again entered an illuminated region or sector. The intensity $E_r(t)$ of the received modulated radiation field can be used as the criterion for issuing an alarm, should certain threshold values of intensity be exceeded, in the positive or in the negative direction. The indicated sector illumination of the monitored area, also makes it possible to use $de_r/dt$ (the rate of change of intensity of the received modulated radiation field) for the evaluation, an alarm being then given if this rate of change exceeds a given threshold value. An evaluation of phase differences of the radiation field can also serve as a criterion for the alarm, but this will not be described in detail.

As mentioned, the room is subdivided, in accordance with FIG. 1, into actively illuminated regions or sectors 7a to 7f and into zones 9a to 9e which are not directly illuminated by radiation emitted by the transmitting elements 6. The individual actively illuminated regions or sectors 7a to 7f are advisedly controlled one after the other, and the scattered radiation of each individual region is evaluated by itself with respect to various alarm and disturbance criteria. In this way, assurance is had that intensive scattered radiation from objects located in the vicinity will not mask such relatively weak changes in field as are caused, for example, by an intruder who is moving through the room at a greater distance.

Figure 3:
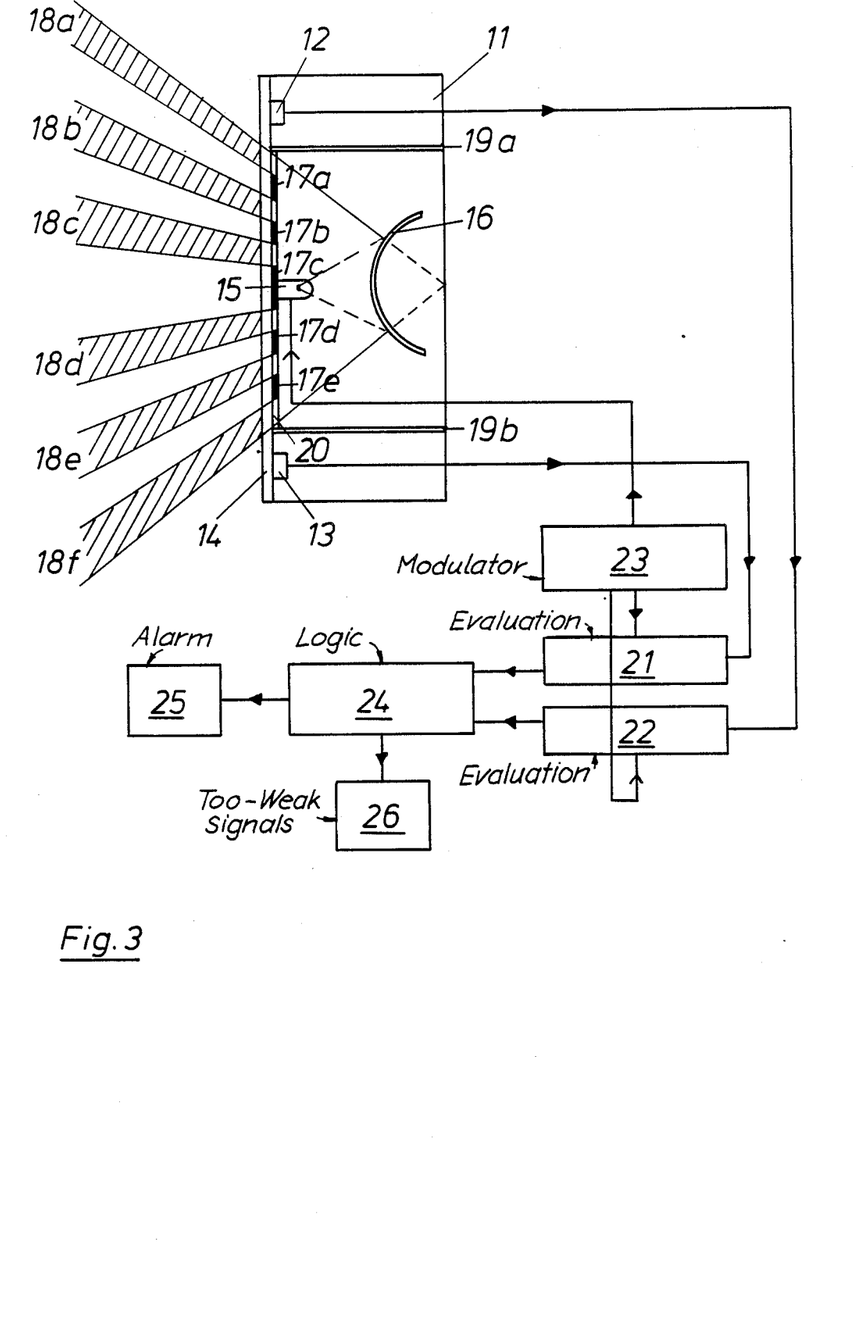
FIG. 3 is a plan view of transmit/receive apparatus for a simple embodiment of the invention.

In the embodiment of FIG. 3, a housing 11 for the room security system is shown to contain a single transmitting element 15, for example, an infrared light-emitting diode IRED, as well as two receiving elements 12, 13. An infrared filter 14 is positioned in front of the transmitting element 15 and the receiving elements 12, 13; the infrared filter 14 is characterized by greatest possible transmission in the response-wavelength region of the receiving and transmitting elements, and by the greatest possible absorption in the rest of the spectrum, it being noted that the infrared filter 14 also prevents an unauthorized person from seeing radiation from the room-security system. It is further noted that, in contrast to passive infrared room-security systems, heating of the infrared filter 14 cannot lead to a false alarm.

The transmitting element 15 is shown by dashed lines to have a radiation characteristic which is adapted to a reflector 16, which in the present simple system may illustratively comprise a spherical segment developed as a reflector. The infrared radiation from element 15 is reflected at 16 and then radiated into the protected room; this radiation is in part intercepted by a perforated or slitted mask 20, causing the room to be divided into angularly spaced illuminated regions or sectors 18a to 18f. The unilluminated zones between illuminated zones 18a to 18f are attributable to webs 17a to 17e (of mask 20) which absorb infrared radiation; and opaque partitions 19a, 19b within housing 11 effectively isolate receiving elements 12, 13 from any direct coupling to the emitted infrared radiation.

The characterizing of light pulses emitted by the transmitting element 15 is effected by means of a modulator 23, which will be understood to determine not only the duty factor of the light pulses and their envelope, but also the selected modulation frequency or the coding of the light pulses. The receiving elements 12, 13 respond only to that portion of the electromagnetic radiation field which is passed by the infrared filter 14.

Although it is conceivable and possible to use only a single evaluation channel connected for time-alternating response to the individual receiving elements 12, 13, as by using analog switches at a given clock frequency which is synchronous to the pulse frequency, it is preferred to employ a separate evaluation channel 21, 22, one for each of the receiving elements 12, 13.

The individual evaluation channels 21, 22 amplify only those portions of the received electromagnetic radiation field which agree in modulation and/or coding and/or pulse frequency with the light pulse emitted via the transmitting element 15. The output signals of the evaluation channels 21, 22 pass to evaluation logic circuitry 24, which is essentially an AND member. If the evaluation logic circuit notes an impermissible disturbing signal on both evaluation channels 21, 22, it gives off the alarm via the device 25.

In the described room-security system, aging processes of the components and slowly accumulating dirt on the optical components can be effectively compensated (neutralized) within a wide range, without impairing operation of the room-security system. However, if these aging and dirtying processes result in such weakening of the signals from the receiving elements 12, 13 as exceeds a given threshold of tolerance (predetermined within evaluation logic circuitry 24), then this fact will be reported via a suitable indicator 26.

Figure 4:
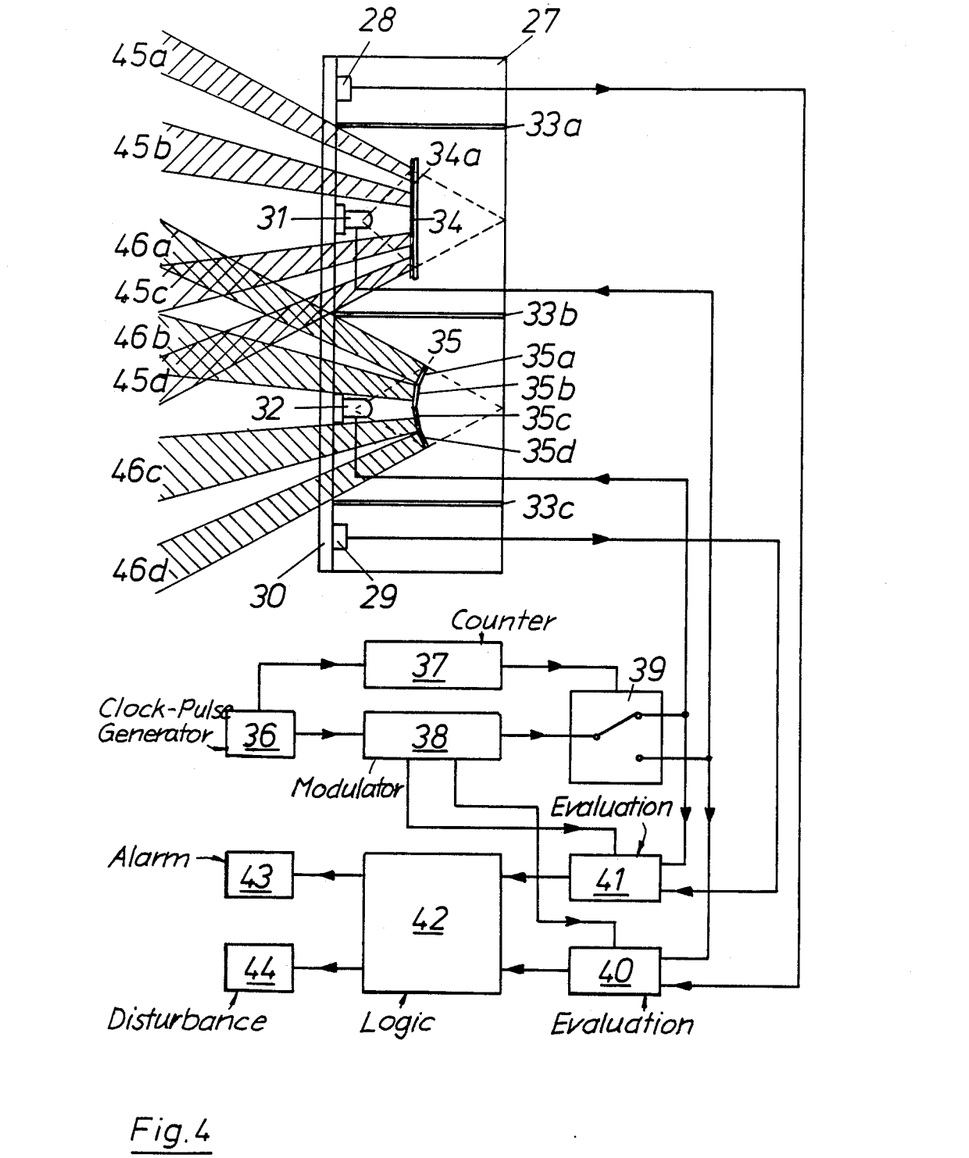
FIG. 4 is a view similar to FIG. 3, to illustrate an embodiment featuring electronic elimination of local disturbances.

FIG. 4 shows another embodiment which is characterized by particularly good assurance against false alarms. The housing 27 contains, behind the common infrared filter 30, in each case two transmitting elements 31, 32 and two receiving elements 28, 29.

Optical separation of the transmitting and receiving elements is effected by partitions 33a-33b-33c, and it may be possible to dispense with the central partition 33b. Light pulses emitted by the transmitting elements 31, 32 are radiated via the reflectors 34, 35 into the room which is to be protected.

Reflectors 34, 35 may be of identical shape, but in FIG. 4 they are shown with different shapes, merely to illustrate that the room to be divided into illuminated regions 45a to 45d, and 46a to 46d, may be thus divided when the reflectors 34, 35 are of any one of a variety of geometrical configurations.

Thus, the reflector 34 is shown as a flat mirror and is provided with a perforated or slit mask 34a or with absorbent layers which effect the desired division into regions or sectors. On the other hand, the reflector 35 is, for example, formed of a plurality of individual reflector segments, in this case segments 35a to 35d. The individual reflector segments 35a to 35d project the radiation cone of the transmitting element 32 onto the individual illuminated regions or sectors 46a to 46d.

The light pulses are processed as desired via a clockpulse generator 36 and a modulator 38. By means of a counter 37 and a selector switch 39, the transmitting elements 31, 32 are selectively controlled to transmit individual light pulses or else groups of pulses.

FIG. 4 further illustrates that, for concurrent but separate evaluations at channels 40, 41, the receiving element 29 is associated with detection of emission scattering from element-31 transmissions, and that receiving element 28 is similarly associated with detection of emission scattering from element-32 transmissions. The giving of a false alarm due to local disturbances, such as, for instance, insects, is substantially eliminated in accordance with the invention by the requirement that an impermissible change in the electromagnetic radiation field must be observed at both receiving elements 28, 29. Thus, the evaluation of the basic criterion for an alarm is effected in evaluation logic circuitry 42 which receives input data via the evaluation channels 40, 41 connected to the respective receiving elements 28, 29. Again, a distinction is made between alarm 43 and disturbance 44.

Figure 5:
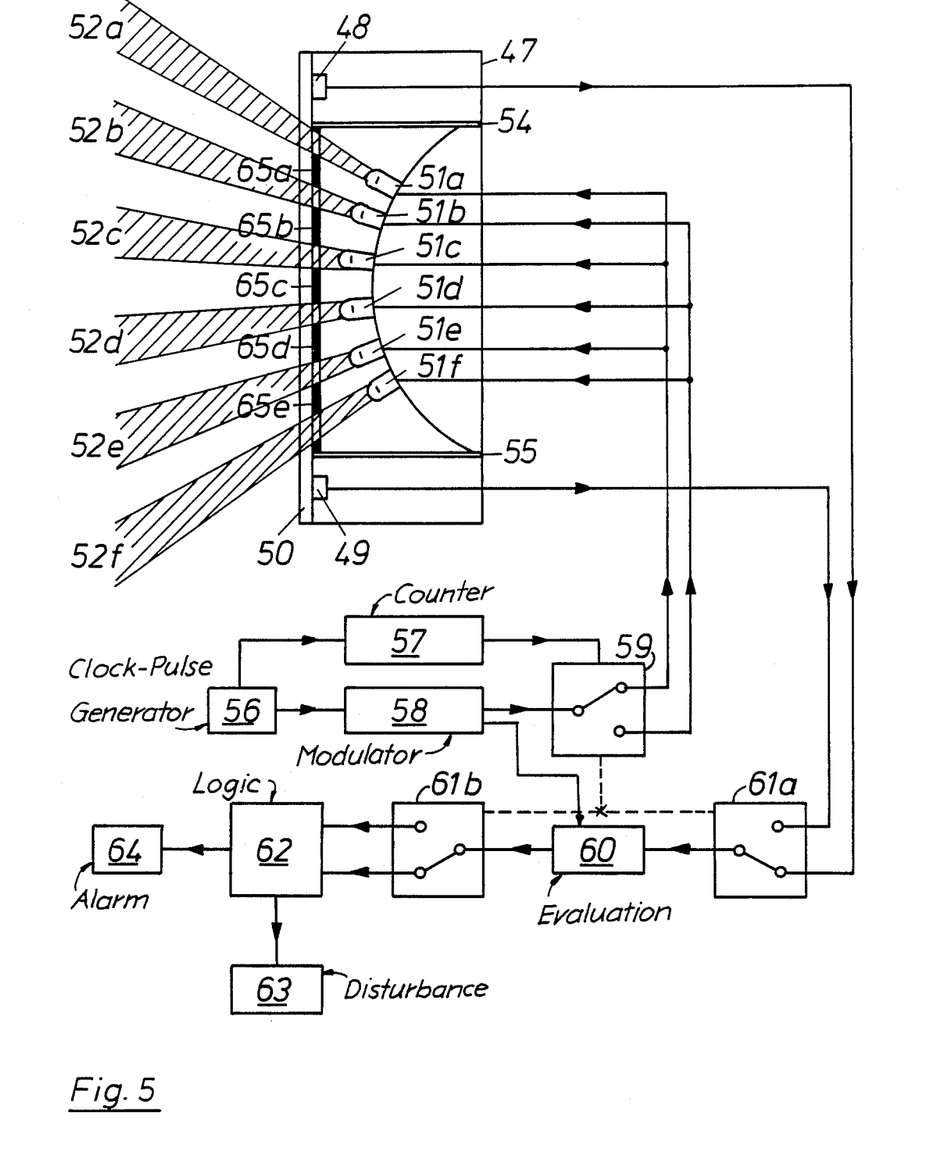
FIG. 5 is another view similar to FIG. 3, to illustrate an embodiment in which separate transmitting elements each radiate in a different one of the plural directional regions or sectors to be illuminated.

In the embodiment of FIG. 5, the housing 47 contains a plurality of transmitting elements 51a to 51f, as well as two spaced receiving elements 48, 49. The infrared filter is designated 50 and the isolation partitions are designated 54, 55. The room-dividing protection pattern of illuminated regions or sectors 52a to 52f (into which light pulses are emitted) is effected by a special alignment of the transmitting elements 51a to 51f, by the selection of a suitably directional radiation characteristic of the transmitting elements, and by the application of suitably absorbent layers 65a to 65e to the infrared filter 50 or, in the alternative, by provision of a suitably perforated or slitted mask between infrared filter 50 and the transmitting elements 51a to 51f. In order to eliminate the influence of local disturbances in this embodiment, the individual transmitting elements are combined in groups, and the individual groups are controlled in common. In FIG. 5, the transmitting elements 51a, 51c, 51e form a first group, and elements 51b, 51d, 51f form a second group; but it will be understood that a different number of transmitting elements as well as a different division into groups, and particularly into more than two groups, is conceivable and possible.

The processing of the transmitting pulses is effected again by means of a clock generator 56, a counter 57 and a modulator 58. The individual groups of transmitting elements are controlled, for emission in time-interlaced alternation, via an analog switch 59. By means of the two analog switches 61a and 61b, both of which are synchronized for operation with switch 59 (as suggested by dashed-line interconnections) it is possible to evaluate the signals of the receiving elements 48, 49 over a single evaluation channel 60 and to distinguish channel 60 and to distinguish between an alarm at 64 and a disturbance at 63, via associated evaluation logic circuitry 62.

Within the evaluation logic circuitry 62, a dynamic comparison of received scatter intensities is effected separately for each individual group of transmitting elements. An impermissible reduction or increase of the scatter intensities is stored digitally for a given time interval. Slowly accumulating dirtying effects are thus compensated and otherwise ignored until the threshold of impermissible reduction is reached.

To enhance system reliability, it is advisable to establish an alarm criterion which requires that impermissible changes in the protected field be detected at at least two neighboring regions or sectors. Therefore, at least two logic signals which overlap each other in time should be present.

FIGS. 6 to 9 illustrate other configurations for obtaining the desired division of the secured room into regions or sectors which are illuminated by the transmitting elements.

Of course, other reflectors and/or focusing lenses are also conceivable and possible. However, they will not be discussed in detail since they are known in the art.

Figure 6:
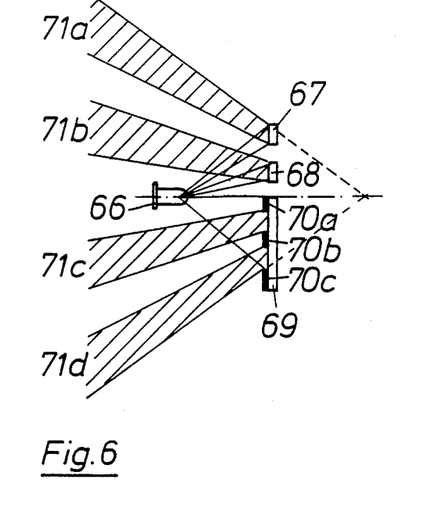
FIGS. 6 to 8 are similar plan-view diagrams to show possible reflector arrangements for obtaining the desired division into regions or sectors.

FIG. 6 is to be understood as showing, on the one hand, a planar arrangement of reflectors; alternatively, and on the other hand, FIG. 6 illustrates a cylindrical arrangement in cross section, wherein the cylindrical axis (not shown) is to the right of the diagram, and in the plane of the diagram. The transmitting element 66 is shown in the upper half of the diagram to be serving two separate mirror segments 67, 68 which serve as reflectors; and in the lower half of the diagram transmitting element 66 is shown serving a continuous mirror reflector 69 having suitable absorbent-layer strips 70a to 70c, to obtain the desired protected-space division into regions or sectors 71c, 71d.

Figure 7:
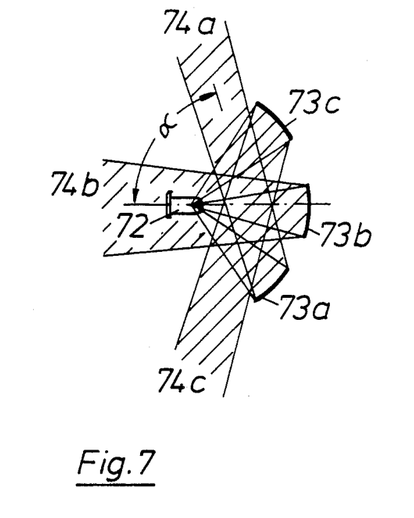

The arrangement of FIG. 7 makes it possible to obtain a particularly large radiation angle α. The individual reflector segments 73a–73c are in spaced curvilinear array and are illuminated by a single transmitting element 72, to effect the divisional pattern 74a to 74c shown in the drawing.

Figure 8:
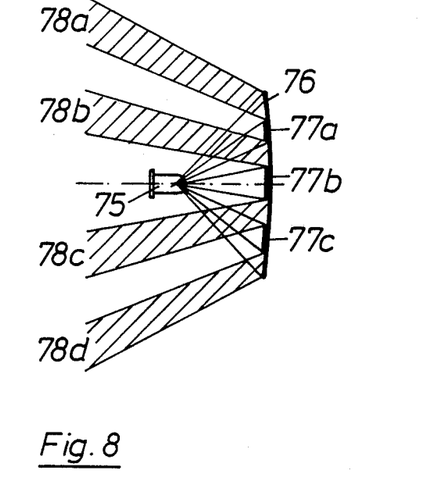

In FIG. 8, a spherical reflector carries spaced absorbing layers 77a to 77c in order to obtain protected-space division into regions or sectors 78a to 78d. Again, a single transmitting element 75 is used.

Figure 9:
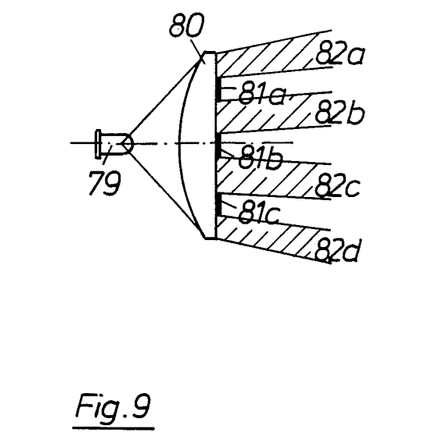
FIG. 9 similarly shows a possible division into regions or sectors by means of a lens.

In FIG. 9, a lens arrangement 80 is illuminated by a single transmitting element 79, and absorbent-layer strips 81a to 81c account for the desired room division into illuminated regions or sectors 82a to 82d.

It is also conceivable and possible to combine several of the room-security systems of the invention which have already been described into a single layer unit and to process the signals of the individual systems in a common evaluation circuit.

By a special adaptation of the regions or sectors to the geometrical shape of given bodies, it is possible to determine the position and/or the geometry of given bodies and to use the output signals for controlling or regulating a machine.

It is also conceivable and possible to develop the individual regions or sectors or else the provision of several systems into one larger unit in such manner that the speed of given bodies or objects and/or their position can be determined.

It will be understood that, for purposes of simplification, the various embodiments of the invention have been described as comprising one or more transmitting elements and various means for mounting the same for directionally limited response in a plurality of angularly spaced intruder-response sectors which span the space field to be protected, while the one or more detector elements are mounted in spaced relation to the transmitting element(s) and such that detector-element response fully laps the space field. But as is well known, the respective roles of transmitting-element responses and detector-element responses can be interchanged in a reversal of roles for any of these various embodiments, so that the description will be understood to apply also to the same embodiments in a transmission/detection role reversal.

Thus, in such a role reversal, the embodiment of FIG. 3 may be taken to illustrate the case wherein a single detector is located at 15 and wherein, by reason of reflector 16 and the slitted mask 20, said single detector is mounted by means 11 for directionally limited response in a plurality of angularly spaced intruder-response sectors (18a ... 18f) which span a space field to be detected. By the same token, two like infrared transmitting elements may be understood to be mounted (at 12 and 14, respectively) by the same means 11 and in spaced relation (laterally of the single detector element), and such that the irradiation response of each of the transmitting elements (at 12 and at 14) fully laps the space field.

Thus further, in another such role reversal, the embodiment of FIG. 4 may be taken to illustrate the case wherein a single infrared-responsive detector element for one subsystem is mounted by means 27 and by reason of reflector 34 and slitted mask 34a, this single detector element has directionally limited response in a plurality of angularly spaced intruder-response sectors (45a ... 45d) which span a space field to be protected. At the same time, another single infrared-responsive detector element for a second subsystem may be understood to be mounted, by the same means 27 and in laterally spaced proximity to the first subsystem, and with equal numbers of intruder-response sectors (46a ... 46d) wherein corresponding sectors of the respective subsystems are oriented in laterally offset proximity and for response to the space field. In the same theme of role reversal for the embodiment of FIG. 4, two like infrared-transmitting elements (at 28 and at 29) may be understood to be mounted by means 27 in spaced adjacency to the two detecting subsystems and such that each of the transmitting elements (at 28 and at 29) can irradiate the space field.

Still further, in yet another such role reversal, the embodiment of FIG. 5 may be taken to illustrate a first subsystem comprising at least one detector element (at 51a, 51c and 51e) wherein the subsystem is mounted by means 47 for directionally limited response in a plurality of angularly spaced intruder-response sectors (52a, 52c and 52e) which are at least three times the angular width of a single intruder-response sectors; and FIG. 5 may be further taken to illustrate a second such subsystem in which at least one detector element (at 51b, 51d and 51f) is also mounted for directionally limited response in plural angular-spaced intruder-response sectors (52b, 52d and 52f) which are interlaced with the intruder-response sectors (52a, 52c and 52e) of the first sub-system. And at least two infrared-transmitting elements (at 48 and at 49) may be understood to be mounted by means 47 in spaced relation to the detecting subsystems and such that each transmitting element (at 48 and at 49) can irradiate the space field. In the indicated role reversal of the embodiment of FIG. 5, it will be seen that, in each of the subsystems, a single detector element determines one and only one response field; for example, a detector element at 51a determines only the response field 52a.

What is claimed is:

1. A security system comprising one infrared-transmitting element and at least two detector elements producing individual electrical output signals in response to infrared radiation within the wavelength region of said transmitting element, means mounting said transmitting element for directionally limited response in a plurality of angularly spaced intruder-response sectors which span a space field to be protected, said mounting means also mounting said detector elements in spaced relation laterally of said transmitting element and such that the response of each of said detector elements fully laps said space field; electronic means including means sampling and storing the output signals of said detector elements in alternation, evaluating means connected to evaluate currently sampled values against stored values in keyed alternation; and threshold-operated alarm means connected to produce an alarm-signal output only upon concurrent evaluation of at least a predetermined difference in value for currently detected vs. stored signals in both a keying interval for one detector element and the successive keying interval for the other detector element.

2. A security system comprising at least two like infrared transmitting elements and one infrared detector element producing an electrical output signal in response to infrared radiation within the wavelength region of said transmitting elements, means mounting said detector element for directionally limited response in a plurality of angularly spaced intruder-response sectors which span a space field to be protected, said mounting means also mounting said transmitting elements in spaced relation laterally of said detector element and such that the irradiation response of each of said transmitting elements fully laps said space field; electronic means including means keying the excitation of said transmitting elements in alternation, evaluating means connected to sample and store detected values for first keying intervals for one transmitting element in alternation with separate sampling and storage of detected values for second keying intervals of the other transmitting element, said evaluating means being connected to separately evaluate currently sampled values against stored values for said first and second keying intervals, and threshold-operated alarm means connected to produce an alarm-signal output only upon concurrent evaluation of at least a predetermined difference in value for detected vs. stored signals in both of said keying intervals.

3. A security system comprising first and second transmitting subsystems wherein each subsystem comprises an infrared-transmitting element mounted for directionally limited response in a plurality of angularly spaced intruder-response sectors which span a space field to be protected, said subsystems being mounted in laterally spaced proximity with equal numbers of intruder-response sectors and with corresponding sectors of the respective subsystem oriented in laterally offset proximity and for response to said space field; at least two detector elements producing individual electrical output signals in response to infrared radiation within the wavelength region of said transmitting subsystems and mounted in spaced adjacency to each other and to said transmitting subsystems such that the response field of each of said detector elements fully laps said space field; electronic means including means sampling and storing the outputs of said detector elements in alternation, evaluating means connected to evaluate currently sampled values against stored values and in alternation synchronized with said keyed alternation; and threshold-operated alarm means connected to produce an alarm-signal output only upon concurrent evaluation of at least a predetermined difference in value for currently detected vs. stored signals in both of said keying intervals.

4. A security system comprising first and second detecting subsystems wherein each subsystem comprises at least one infrared-responsive detector element mounted for directionally limited response in a plurality of angularly spaced intruder-response sectors which span a space field to be protected, said subsystems being mounted in laterally spaced proximity with equal numbers of intruder-response sectors and with corresponding sectors of the respective subsystems oriented in laterally offset proximity and for response to said space field; at least two laterally spaced transmitting elements for transmitting infrared radiation within the response wavelength region of said detector elements, said transmitting elements being mounted in spaced adjacency to said detecting subsystems and such that each of said transmitting elements can irradiate said space field; electronic means including key means keying said transmitting elements for alternating transmission, means for sampling and storing the separate output of said detector elements in keyed synchronism with the keying of said transmitting elements, evaluating means connected to evaluate currently sampled values against stored values in alternation synchronized with said keyed alternation; and threshold-operated alarm means connected to produce an alarm-signal output only upon concurrent evaluation of at least a predetermined difference in value for currently detected vs. stored signals in both of said keying intervals.

5. A security system comprising first and second transmitting subsystems wherein each subsystem comprises at least one infrared-transmitting element and wherein the subsystem is mounted for directionally limited response in a plurality of angularly spaced intruder-response sectors which span a space field to be protected, said intruder-response sectors being spaced by at least substantially three times the angular width of a single intruder-response sector, and the mounting of said subsystems being such that the intruder-response sectors of one subsystem are in substantially uniformly spaced interlace with the intruder-response sectors of the other system in their mutual coverage of said field; at least two detector elements producing individual electrical output signals in response to infrared radiation within the wavelength region of said transmitting subsystems and mounted in spaced adjacency to each other and to said transmitting subsystems such that the response field of each of said detector elements fully laps said space field; electronic means including key means alternately keying said transmitting elements for alternating transmission, means for sampling and storing the separate outputs of said detector elements in keyed synchronism with the keying of said transmitting elements, evaluating means connected to evaluate currently sampled values against stored values in alternation synchronized with said keyed alternation; and threshold-operated alarm means connected to produce an alarm-signal output only upon concurrent evaluation of at least a predetermined difference in value for currently detected vs. stored signals in both of said keying intervals.

6. The system of claim 5, in which each of said subsystems comprises a plurality of transmitting elements, there being one transmitting element determining each intruder-response sector.

7. A security system comprising first and second detecting subsystems wherein each subsystem comprises at least one detector element and wherein the subsystem is mounted for directionally limited response in a plurality of angularly spaced intruder-response sectors spaced by at least substantially three times the angular width of a single intruder-response sector, and the mounting of said subsystems being such that the intruder-response sectors of one subsystem are in substantially uniformly spaced interlace with the intruder-response sectors of the other system in their mutual coverage of said field; at least two laterally spaced transmitting elements for transmitting infrared radiation within the response wavelength region of said detector elements, said transmitting elements being in spaced adjacency to said detecting subsystems and such that each of said transmitting elements can irradiate said space field; electronic means including key means keying said transmitting elements for alternating transmission, means for sampling and storing the separate outputs of said detector elements in keyed synchronism with the keying of said transmitting elements.

8. The system of claim 7, in which each of said subsystems comprises a plurality of detector elements, there being one detector element determining each intruder-response sector.

9. The system of claim 7, and including threshold-operated alarm means connected to produce an alarm-signal output only upon concurrent evaluation of at least a predetermined difference in value for currently detected vs. stored signals in both of said keying intervals.

10. The system of any one of claims 1, 2, 3, 4, 5, and 7, in which said evaluating means further includes a threshold-operated indicator connected to produce a disturbance indication only upon occurrence of a single evaluation of said predetermined difference to the exclusion of another current such evaluation of said predetermined difference.

11. The system of any one of claims 1, 2, 3, 4, 5, and 7, in which a barrier element is interposed between each adjacency of a detecting element to a transmitting element.

12. The system of any one of claims 1, 2, 3, 4, 5 and 7, in which said sectors are spaced to an extent which is substantially the effective angular width of a sector.

13. The system of any one of claims 2, 4, 5 and 7, in which said transmitting elements are modulated to produce code-modulated pulses of infrared radiation.

14. The system of any one of claims 1, 2, 3, 4, 5, and 7, in which each said subsystem includes a mask that is apertured to define said sectors.

* * * * *